United States Patent
Kamalanathan

[19]

[11] Patent Number: 6,052,727
[45] Date of Patent: *Apr. 18, 2000

[54] METHOD OF DISCOVERING CLIENT SYSTEMS ON A LOCAL AREA NETWORK

[75] Inventor: Chandar Kamalanathan, Austin, Tex.

[73] Assignee: Dell U.S.A., L.P., Round Rock, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,379

[22] Filed: Oct. 27, 1997

[51] Int. Cl.[7] ........................................ G06F 13/00
[52] U.S. Cl. .................................................. 709/224
[58] Field of Search ........................ 364/DIG. 1 MS File, 364/DIG. 2 MS File; 395/200.3, 200.33, 200.51, 200.52, 200.53, 200.54–200.55, 200.56; 709/200, 203, 221, 222, 223, 224–225, 226

[56] References Cited

U.S. PATENT DOCUMENTS 5,185,860  2/1993  Wu ...................................... 395/200.56
5,594,873  1/1997  Garrett ..................................... 395/281
5,636,342  6/1997  Jeffries ............................... 395/185.01
5,778,377  7/1998  Marlin et al. ............................ 707/103

OTHER PUBLICATIONS

Lynch et al "Internet System Handbook", Addison–Wesley Publishing Company Inc. (1993) (Chapter 12) pp. 493–519.

*Primary Examiner*—Robert B. Harrell
*Attorney, Agent, or Firm*—Haynes & Boone, L.L.P.

[57] ABSTRACT

A method of discovering LAN clients running desktop management interface ("DMI") 2.0 is described. In particular, responsive to a discovery request, a DMIADMIN running on a LAN administrator broadcasts a discovery packet to the LAN and then awaits responses in the form of reply packets from desktop management interface ("DMI") agents installed on LAN clients running DMI 2.0. Each reply packet contains data indicating the corresponding client's system type (e.g., notebook or desktop), name, and network address.

19 Claims, 1 Drawing Sheet

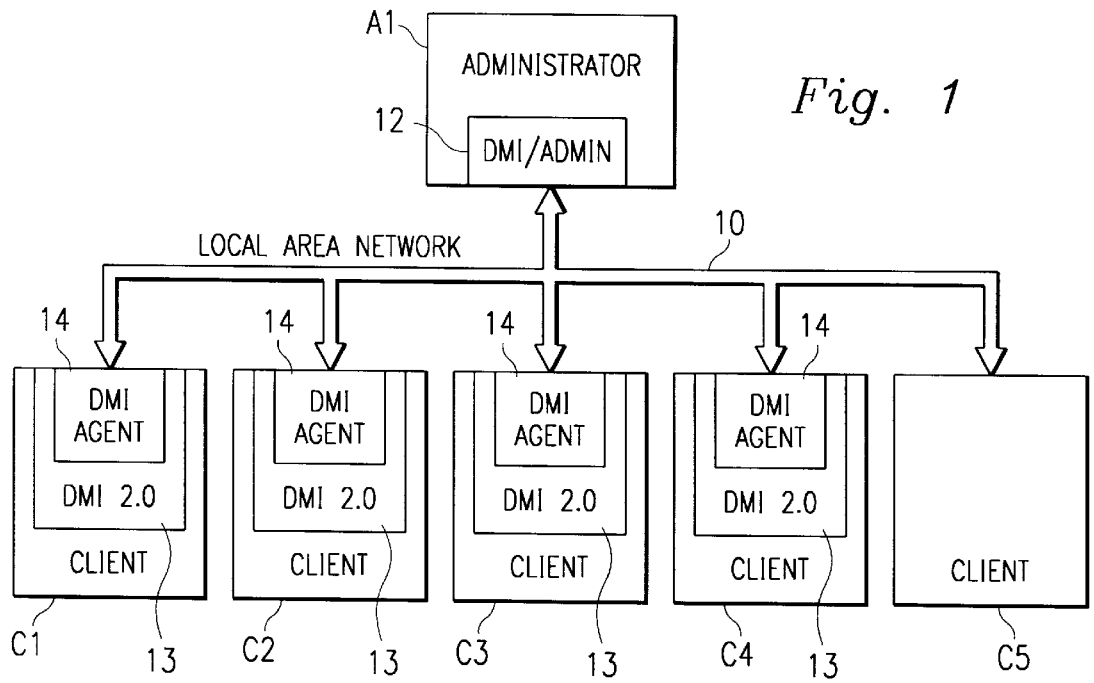
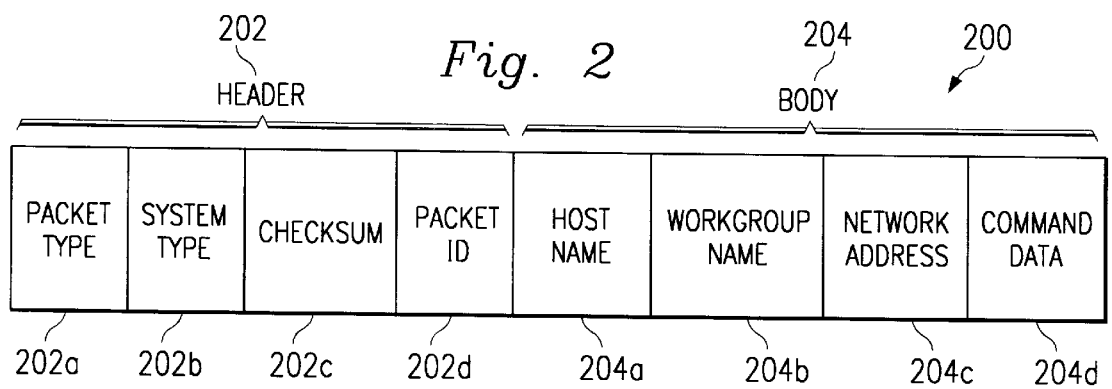
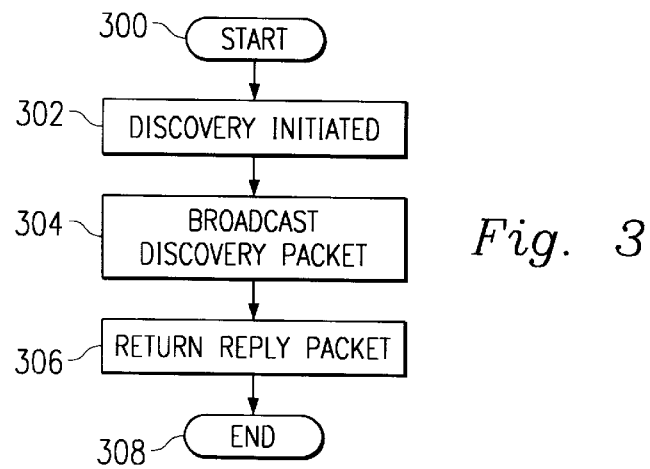

METHOD OF DISCOVERING CLIENT SYSTEMS ON A LOCAL AREA NETWORK

TECHNICAL FIELD

The disclosure relates generally to discovering client systems on a local area network ("LAN") and, more particularly, to an improved method of discovering such client systems.

BACKGROUND

In a computer local area network ("LAN") environment, it is necessary for a computer system designated as the "server" or "administrator" to determine the addresses of any client computer systems connected to the LAN in order to remotely access information therefrom. In order to accomplish this, the administrator must "discover," or determine the identity of, all clients on the LAN. Currently, this discovery process is performed by the administrator independently addressing, or "pinging," each IP address and awaiting a response indicating that a client is present at that address. No response indicates that a client is not present. At the end of this process, the administrator knows at which IP addresses clients are installed, as well as the IP address of each such client.

While this process is effective, in that it enables the administrator reliably to determine the IP addresses of clients on a LAN, it is very time consuming. Specifically, it can take between three and four hours for the administrator to ping each network IP address and determine where the clients are installed.

Accordingly, what is needed is a more efficient method of discovering clients running on a LAN.

SUMMARY

One embodiment, accordingly, discovers LAN clients running desktop management interface ("DMI") 2.0. In particular, responsive to a discovery request, a DMIADMIN running on a LAN administrator broadcasts a discovery packet to the LAN and then awaits responses in the form of reply packets from desktop management interface ("DMI") agents installed on LAN clients running DMI 2.0. Each reply packet contains data indicating the corresponding client's system type (e.g., notebook or desktop), name, and network IP address.

A technical advantage achieved with the embodiment is that the discovery process can be completed much more quickly, i.e., within seconds, than with previous methods, which take hours to complete.

BRIEF DESCRIPTION OF THE DRAWINGS

FIG. 1 is a system block diagram of a local area network ("LAN") embodying features of one embodiment.

FIG. 2 illustrates the format of a discovery packet in accordance with one embodiment.

FIG. 3 is a flowchart of the preferred embodiment.

DESCRIPTION OF THE PREFERRED EMBODIMENT

As shown in FIG. 1, connected to a local area network ("LAN") 10 are a computer system designated as the LAN administrator A1 and several computer systems designated as clients C1, C2, C3, C4, and C5. The administrator A1 includes DMIADMIN software 12 for implementing features described herein and each of the clients C1–C4 includes software for implementing a desktop management interface ("DMI"), in particular, DMI version 2.0 ("DMI 2.0") 13, as well as other features, as described below. The DMI 2.0 13 includes a DMI agent 14, which includes software for implementing features described herein.

Responsive to a discovery request initiated by a user, the DMIADMIN software 12 broadcasts onto the LAN 10 a discovery packet (FIG. 2A). The discovery request may be initiated by, for example, the user's selecting a designated GUI element displayed on the user's computer system display or depressing a designated key of the user's computer system keyboard. Responsive to receipt of the discovery packet, each of the DMI agents 14 of the clients C1–C4 sends back to the administrator A1 a reply packet containing data indicating the client's system type (e.g., notebook or desktop), name, and network address.

In contrast, because the client C5 does not have DMI 2.0 installed thereon and therefore does not have a DMI agent, the client C5 will not send a reply packet to the administrator A1 and hence will not be "discovered". In other words, the existence of the client C5 will not be recognized by the administrator A1.

FIG. 2 illustrates the format of a discovery packet 200. In particular, the packet 200 includes an header portion 202 and a body 204. The header portion 202 includes a Packet Type segment 202a, which designates the packet as a broadcast or command packet. The discovery packet 200 will always be a broadcast packet. The discovery packet 200 also includes a System Type segment 202b (described herein), a Check-Sum segment 202c, which contains a checksum for the packet 200, and a Packet ID segment 202d, which contains an identification of the packet 200. The body 204 includes a HostName segment 204a (described herein), a WorkGroup Name segment 204b, which contains the DMI workgroup name, a NetworkAddress segment 404c (described herein), and a Command Data segment 204d, which contains commands for future updates.

Responsive to a discovery request initiated by a user, the DMIADMIN software 12 broadcasts onto the LAN 10 a discovery packet 200. Responsive to receipt of the discovery packet 200, each of the DMI agents 14 of the clients C1–C4 fills in the System Type segment 202b with data indicating the client's system type (e.g., notebook or desktop), the HostName segment 204a with the client's name, and the NetworkAddress segment 404c with the client's network IP address and returns the thus completed discovery packet 200 to the DMIADMIN 12 software as a reply packet.

Now turning to FIG. 3, the method of the preferred embodiment will now be described. The method begins at block 300 and then the discovery is initiated in block 302. Once the discovery is initiated, the LAN administrator broadcasts a discovery packet onto the LAN as represented in block 304. Each client that has the DMI agent sends back a reply packet as represented in block 306. The process then ends at block 308.

The embodiment described above enables discovery to be performed much more quickly that previous methods allowed. For example, for a LAN having 26 clients installed thereon, discovery can be completed in 15 seconds, as compared to several hours with the method described above in the Background.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A method of discovering at least two client computer systems with a desktop management interface on a local area network ("LAN"), the method comprising:

broadcasting a discovery packet from a LAN administrator to said at least two client computer systems on said LAN; and sending at least two reply packets to said LAN administrator from said desktop managment software on each of at least two client computer systems wherein said at least two reply packets separately identify each of said at least two client computer systems, and wherein said at least two reply packets are sent generally simultaneously.

2. The method of claim 1 wherein each one of said at least two reply packets include a network IP address of each one of said at least two client computer systems.

3. The method of claim 1 wherein each one of said at least two reply packets include an indication of a system type of each one of said at least two client computer systems.

4. The method of claim 1 wherein each one of said at least two reply packets include an indication of a name of each one of said at least two client computer systems.

5. The method of claim 1 wherein said discovery request is initiated by a user.

6. The method of claim 1 further including transmitting a discovery request initiated from a discovery agent on one of said at least two client computer systems to said LAN administrator.

7. The method of claim 1 wherein said broadcasting a discovery packet is initiated from a discovery administrator on said LAN administrator.

8. A system for enabling discovery of at least two client computer systems with a desktop management interface on a local area network ("LAN"), the system comprising:

at least two clients each capable of sending a discovery request and replying to a discovery packet from said desktop management interface generally simultaneously, wherein said replying to said discovery packet identifies each one of said at least one client; and a LAN administrator connected to said at least two clients by the LAN and capable of receiving the discovery request and sending said discovery packet to said at least two clients.

9. The system of claim 8 wherein each one of said at least two reply packets include a network IP address of each of said at least two clients.

10. The system of claim 8 wherein each one of said at least two reply packets include an indication of a system type of each of said at least two clients.

11. The system of claim 8 wherein each one of said at least two reply packets include an indication of a name of each of said at least two clients.

12. The system of claim 8 wherein said discovery request is initiated by a user.

13. The system of claim 8 wherein each of said at least two client computer systems include a discovery agent that initiates said discovery request.

14. The system of claim 8 wherein said LAN administrator includes a discovery administrator that broadcasts said discovery packet.

15. A computer program for enabling the discovery of at least two clients with a desktop management interface on a local area network ("LAN") and stored on computer readable media, the computer program comprising:

instructions for causing a LAN administrator to broadcast a discovery packet onto said LAN; and instructions for causing said desktop management interface on each of at least two clients to generally reply simultaneously to said discovery packet through a reply packet and identify each of said at least two clients to said LAN administrator through said reply packet.

16. The computer program of claim 15 wherein each one of said reply packet includes a network IP address of each of said at least two clients.

17. The computer program of claim 15 wherein each one of said reply packet includes an indication of a system type of each of said at least two clients.

18. The computer program of claim 15 wherein each one of said reply packet includes an indication of a name of each of said at least two clients.

19. The computer program of claim 15 further including sending a discovery request initiated by a user.

* * * * *

UNITED STATES PATENT AND TRADEMARK OFFICE
CERTIFICATE OF CORRECTION

PATENT NO.     : 6,052,727
DATED          : April 18, 2000
INVENTOR(S)    : Chandar Kamalanathan Page 1 of 1

It is certified that error appears in the above-identified patent and that said Letters Patent is hereby corrected as shown below:

<u>Column 3,</u>
Line 5, after "from", delete [a], and insert -- said --.

Signed and Sealed this

Second Day of April, 2002

Attest:

JAMES E. ROGAN
*Attesting Officer*   *Director of the United States Patent and Trademark Office*